United States Patent
Yamazaki et al.

(10) Patent No.: US 7,591,698 B2
(45) Date of Patent: Sep. 22, 2009

(54) VEHICLE LIGHTING DEVICE MANUFACTURING METHOD FOR POSITIONING AND WELDING A COVER TO A HOUSING

(75) Inventors: Kazuhiro Yamazaki, Shizuoka (JP); Ryosuke Yasuda, Shizuoka (JP); Fujihiko Sugiyama, Shizuoka (JP); Michihiko Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 703 days.

(21) Appl. No.: 11/338,960

(22) Filed: Jan. 25, 2006

(65) Prior Publication Data

US 2006/0163214 A1    Jul. 27, 2006

(30) Foreign Application Priority Data

Jan. 26, 2005    (JP)    ............................. 2005-018229

(51) Int. Cl.
G01N 23/223    (2006.01)
H01J 9/50    (2006.01)

(52) U.S. Cl. ................. 445/2; 445/44; 445/46
(58) Field of Classification Search ...................... 445/2, 445/46, 44
See application file for complete search history.

(56) References Cited

FOREIGN PATENT DOCUMENTS

| JP | 2000-52900 | 2/2000 |
|---|---|---|
| JP | 2000-52901 | 2/2000 |
| JP | 2004-71869 | 3/2004 |
| JP | 2004-74734 | 3/2004 |

OTHER PUBLICATIONS

Patent Abstracts of Japan, Publication No. 2004-074734, Publication Date: Mar. 11, 2004, 1 page.
Patent Abstracts of Japan, Publication No. 2004-071869, Publication Date: Mar. 4, 2004, 1 page.
Patent Abstracts of Japan, Publication No. 2000-052900, Publication Date: Feb. 22, 2000, 1 page.
Patent Abstracts of Japan, Publication No. 2000-052901, Publication Date: Feb. 22, 2000, 1 page.
Korean Office Action issued in Korean Application No. 10-2006-0006782 dated Dec. 15, 2006 and English translation thereof, 8 pages.

*Primary Examiner*—Joseph L Williams
(74) *Attorney, Agent, or Firm*—Osha • Liang LLP

(57) ABSTRACT

A vehicle lighting device manufacturing method, for joining a transparent cover with a housing ray welding, includes: a preliminary heating step of preparing welding portions of the transparent cover and the housing, and of forming, on part of the welding portion of the transparent cover and/or the housing, a built-up portion, which overlays a welding portion in a design, and heating and softening the built-up portion; a pressure-bonding step of pressure-bonding the welding portion of the transparent cover to the welding portion of the housing; and a welding step of welding the transparent cover and the housing that are pressure-bonded together by the emission of a light beam that irradiates the welding portion of the transparent cover and the housing along the entire length of edges.

13 Claims, 7 Drawing Sheets

VEHICLE LIGHTING DEVICE MANUFACTURING METHOD FOR POSITIONING AND WELDING A COVER TO A HOUSING

BACKGROUND OF THE INVENTION

1. Technical Field

The present invention relates to a method for manufacturing new vehicle lighting devices, and particularly to a technique, employed by a vehicle lighting device manufacturing method for joining a transparent cover and a housing using ray welding, whereby secure joining of the transparent cover and the housing is ensured.

2. Related Art

For the manufacture of vehicle lighting devices, such as automobile lighting devices, a process is required for attaching a transparent cover to a housing to cover the front opening of the housing.

Conventionally, for the attachment of the transparent cover to the housing, a method is generally employed whereby seal legs are projected at the external edges of the transparent cover, while a groove is formed in the housing to accept the seal legs, so that the seal legs of the transparent cover are fitted to the groove of the housing with a sealing material or an adhesive material. Using this attachment method, however, since the seal legs and the groove are located at a portion extending outward from the external edges of the transparent cover and the housing, a comparatively large light blocking portion, i.e., a dark portion, is formed at the external edge area when the transparent cover is viewed from the front. Thus, the light emitting area is small when compared with the overall size of the transparent cover.

To resolve this problem, a method for joining the seal legs of the transparent cover directly to the face of the housing has been proposed. With this method, when the seal legs of the transparent cover and the housing are joined directly, only a small joining margin is required, so that only an extremely narrow dark portion is formed at the outer edge of the transparent cover. Furthermore, hot plate welding or oscillating welding, for example, is generally employed as means for directly joining the seal legs to the housing. According to this means used for the joining of the transparent cover and the housing, the materials of the transparent cover and the housing are melted and mixed at the joint and are then cooled and solidified. However, surplus molten material flows out of the joint and is visible from the front, through the transparent cover, and detracts from and adversely affects the external appearance.

Further, for various types of welding there are shape limitations (inclination angle limitations), e.g., for vibration welding, relative to the direction of vibration, a substantially flat state is required, and for hot plate welding, there can be no extreme inclination in the direction in which a hot plate is pressed. As a result, current three-dimensional design needs cannot be met.

Another method for joining a transparent cover and a housing is ray welding, such as laser welding. When laser welding is used, the molten state of the material, i.e., the result of energy irradiation at the joint, can be stabilized by controlling the output of the laser, the diameter of the laser spot at the joint and the speed at which scanning is performed. Therefore, the overflow of molten material, the result of excessive melting, can be resolved, and even a complicated shape can be handled. By using a laser beam to irradiate the housing through the transparent cover, the laser beam heats and melts the material of the housing while thermal conduction melts the material of the transparent cover, and the two materials are fused and pressure-bonded together.

According to the principles of laser welding, the welding portion of the transparent cover and the welding portion of the housing should contact each other precisely, otherwise a welding failure will occur.

However, since the transparent cover and the housing of a vehicle lighting device are resin molding products, it is actually difficult for products having shapes exactly as designed to be extracted, because shrinking, for example, can cause the products to be warped and otherwise malformed after molding. Accordingly, it is difficult for the transparent cover and the housing to precisely contact each other along the entire length of their external edges. And when the transparent cover and the housing do not precisely contact each other, heat applied to the housing by the laser will not be transmitted to the transparent cover, and the welding process will fail.

In order to eliminate the inferior contact condition that is the result of the molding process problem described above, and that adversely affects the welding of the portions of the two resin molding products that are to be joined using laser welding, a technique is disclosed in patent document 1. According to this technique, prior to the use of laser welding, the welding portions of two resin molding products are preliminarily heated to respective temperatures equal to or higher than the heat deformation temperatures of the resin materials of the two, and thus are softened. Then, when the two welding portions are actually pressure-bond to each other, the soft portions are deformed together, brought into close contact, and thereafter, the laser welding procedure is performed.

[Patent Document 1] JP-A-2004-74734

SUMMARY OF THE INVENTION

According to the technique described in patent document 1, the welding portions of the two resin molding products, which are to be welded together, are softened along the entire length of their edges by preliminary heating. Therefore, when one of the resin molding products is pressure-bonded to the other, so that they closely contact each other, the two welding portions are deformed along the entire length of their edges and a plane used as a reference disappears, and for the members to be joined, positioning accuracy is deteriorated.

Furthermore, since the welding portions are softened along the entire length of their edges, more than the amount of resin that is necessary is pushed in, and at such a location, the resin flows outward, from the welded portion, forming a flash, which detracts from the external appearance of the product.

One or more embodiments of the the present invention provide accurate, relative positioning of a transparent cover and a housing so that they correctly contact each other during a ray welding process, such as laser welding, and can be joined together, using laser welding, without the process having a deleterious affect on the accuracy of their positioning and external appearance.

According to one or more embodiments of the present invention, a vehicle lighting device manufacturing method comprises:

a preliminary heating step of preparing welding portions of a transparent cover and a housing, and of forming, on part of the welding portion of the transparent cover and/or the housing, a built-up portion, which overlays a welding portion in a design, and heating and softening the built-up portion;

a pressure-bonding step of pressure-bonding the welding portion of the transparent cover to the welding portion of the housing; and a welding step of welding the transparent cover and the housing that are pressure-bonded together by irradiating a light beam onto the welding portions of the transparent cover and the housing along the entire length of edges.

Therefore, according to one or more embodiments of the vehicle lighting device manufacturing method of the invention, only the built-up portion is deformed at the pressure-bonding step, and the welding portion of the transparent cover and the welding portion of the housing contact each other exactly.

According to a first aspect one or more embodiments of the invention, a vehicle lighting device manufacturing method, for jointing a transparent cover with a housing using ray welding, comprises:

a preliminary heating step of preparing welding portions of the transparent cover and the housing, and of forming, on part of the welding portion of the transparent cover and/or the housing, a built-up portion, which overlays a welding portion in a design, and heating and softening the built-up portion;

a pressure-bonding step of pressure-bonding the welding portion of the transparent cover to the welding portion of the housing; and a welding step of welding the transparent cover and the housing that are pressure-bonded together by irradiating a light beam onto the welding portions of the transparent cover and the housing along the entire length of edges.

Therefore, according to the vehicle lighting device manufacturing method of these embodiments, before performing the step to bring the welding portion of the transparent cover into contact with the welding portion of the housing, the built-up portion formed on the welding portion of the transparent cover and/or the welding portion of the housing is softened at the preliminary heating step. Thus, when the built-up portion is deformed at the pressure-bonding step, not only the built-up portion formed on the welding portion of the transparent cover and the housing, but also portions other than those whereat the built-up portion is formed can contact each other. Therefore, the subsequent laser welding process can be smoothly performed. And, in addition, since the locations where flashes are generated can be limited to those where a built-up portion is formed, instead of extending along all the joined edges, the external appearance can be improved.

According to a second aspect of one or more embodiments of the invention, a built-up portion is formed on the welding portion, the plane of which has a predetermined inclination relative to a plane perpendicular to the direction in which pressure is applied at the pressure-bonding step. Therefore, failure of the welding portion of the transparent cover to contact that of the housing can be prevented on the plane having a predetermined inclination relative to the plane that is perpendicular to the direction pressure is applied and where a gap tends most often to occur between the transparent cover and the housing.

According to a third aspect of one or more embodiments of the invention, a built-up portion is arranged at a portion where design data for the transparent cover and design data for the housing are offset relative to each other, and where the possibility that a gap relative to the offset value will occur is increased between the welding portion of the transparent cover and that of the housing. Therefore, accurate contact is ensured at the portions whereat contact failures tend to occur between the welding portion of the transparent cover and that of the housing.

According to a fourth aspect of one or more embodiments of the invention, a lower jig having an engaging portion is prepared to support the housing, while for the housing, a pair, at the least, of opposed engaged portions are provided to engage the engaging portion, and at the welding step, the housing is supported by the lower jig while the engaged portions are held by the engaging portion of the lower jig. Therefore, when there is a slight difference between the welding portion of the housing and the design shape, the engaged portions of the housing need only be forcibly engaged by the engaging portion of the lower jig. The deformation of the welding portion of the housing can then be corrected, and a welding portion closely corresponding to the design shape can be obtained.

DETAILED DESCRIPTION OF THE INVENTION

Embodiments of the vehicle lighting device manufacturing method according to the present invention will now be described while referring to the accompanying drawings.

Figure 1:
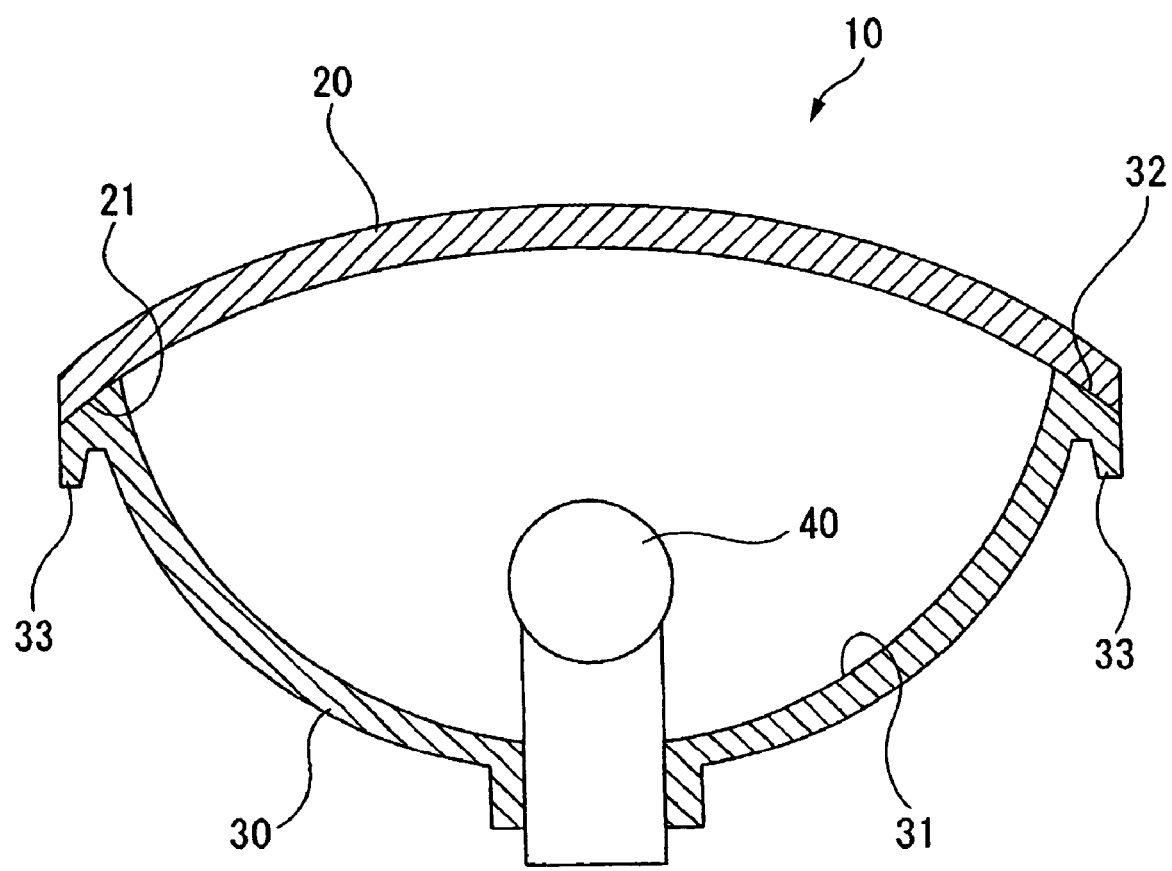
FIG. 1 is a schematic cross-sectional view of an example vehicle lighting device.

FIG. 1 is a diagram showing an example vehicle lighting device.

Figure 2:
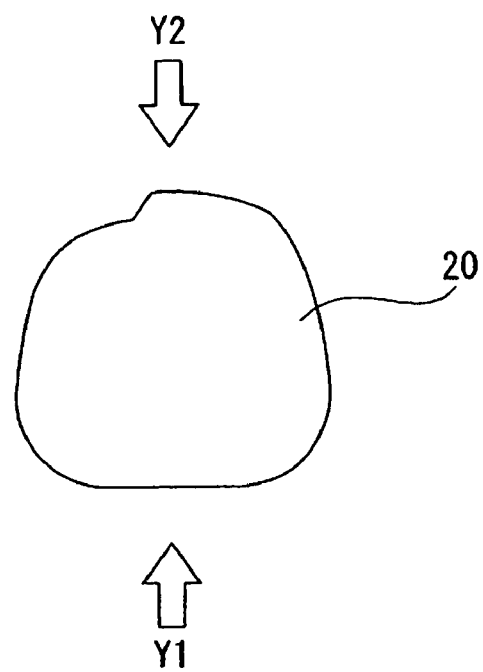
FIG. 2A is a schematic plan view of the state wherein a transparent cover and a housing are separated vertically, located at a distance.
FIG. 2B is a diagram as viewed along an arrow Y1 in FIG. 2A.
FIG. 2C is a diagram as viewed along an arrow Y2 in FIG. 2A.
Figure 2:
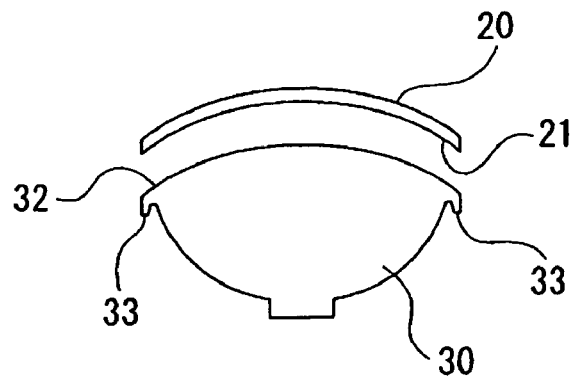
Figure 2:
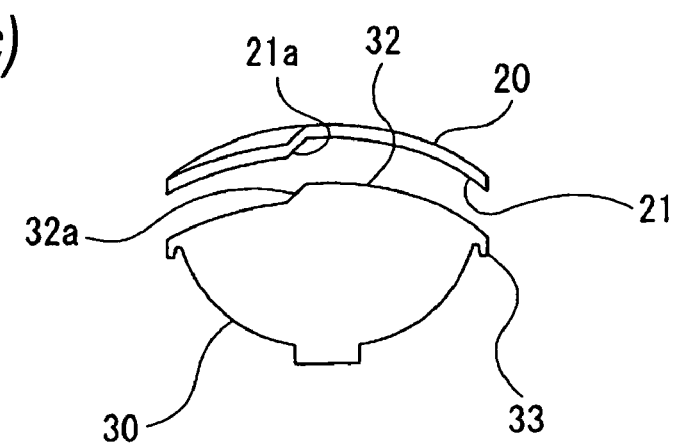

A vehicle lighting device 10 includes a transparent cover 20 and a housing 30. The housing 30 includes a recessed portion 31 having an opening to the front, and provided around the edge of the opening is a front face 32 that is used as a welding face. An inclined portion 32a (see FIG. 2), inclined substantially from the front to the rear, is formed on a part of the welding face 32, and an engaged portion 33, shaped like an inverted groove, is formed to the rear of the housing 30 along the opening edge. The housing 30 is produced by the injection molding of a plastic, such as ASA (acrylonitrile/styrene/acrylate), for which one property is the superior absorption of rays, such as those produced by lasers.

The transparent cover 20 is produced by the injection molding of a light transmitting plastic, such as an acrylic resin. A welding face 21, formed on the reverse side of the outer edge, has a shape corresponding to that of the welding face 32 of the housing 30.

The welding face 21 of the transparent cover 20 is joined with the welding face 32 of the housing 30 using ray welding, and a light source bulb 40 is supported by the housing 30. In this manner, the vehicle lighting device 10 is obtained.

The welding face 21 of the transparent cover 20 is designed so that it contacts the housing 30 along the entire front face of the welding face 32. However, since as described above, the transparent cover 20 and the housing 30 are molded resin products, because, for example, of shrinking, warping and deformation after molding, it is actually difficult to extract products for which the shapes are exactly as designed. Thus, when the welding face 21 of the transparent cover 20 is simply aligned with the welding face 32 of the housing 30, there will be portions where the faces do not contact each other.

FIGS. 2 to 7 are diagrams showing a vehicle lighting device manufacturing method according to one embodiment of the present invention.

Figure 3:
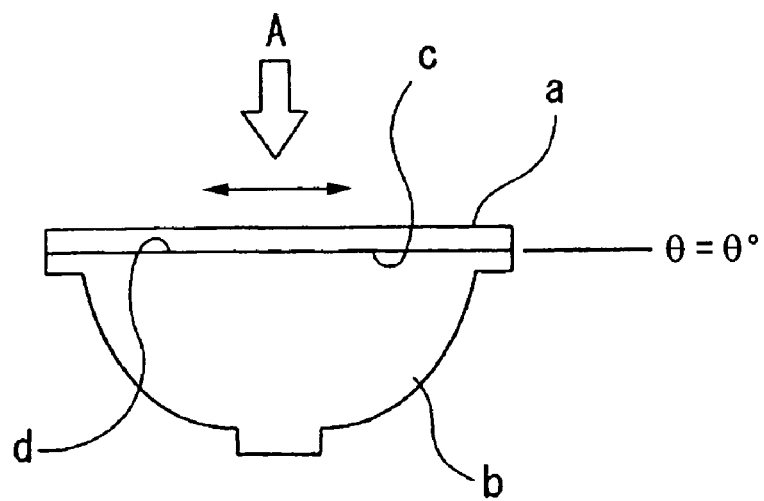
FIG. 3A is a schematic side view showing a relationship between an inclination angle and shifting, relative to the plane perpendicular to a pressure application direction, i.e., a case wherein there is no inclination angle.
FIG. 3B is a schematic side view of a case wherein a large inclination angle is present.
Figure 3:
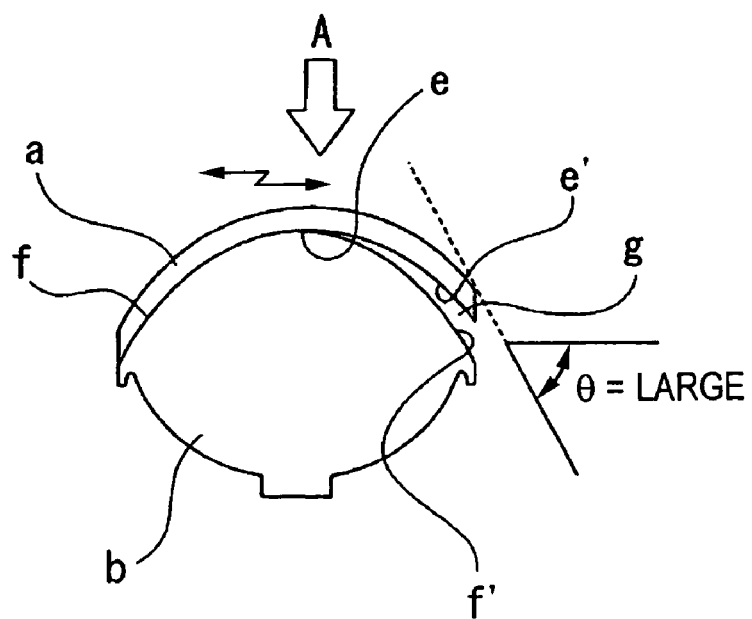
Figure 4:
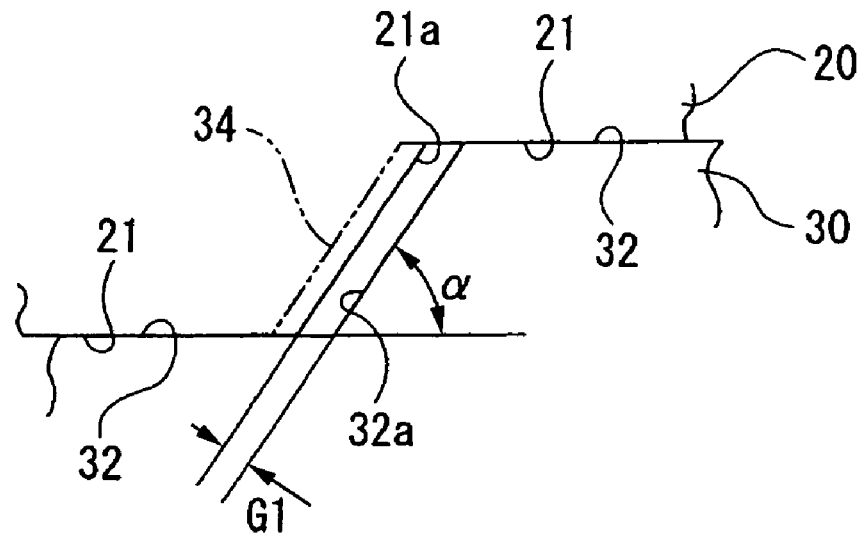
FIG. 4A is a schematic enlarged side view of a position whereat a built-up portion and an action resulting from the formation of the built-up portion, and showing a gap that occurs between the transparent cover and the housing in a case wherein a built-up portion is not formed.
FIG. 4B is a schematic enlarged side view of a resultant action during a pressure-bonding process.
Figure 4:
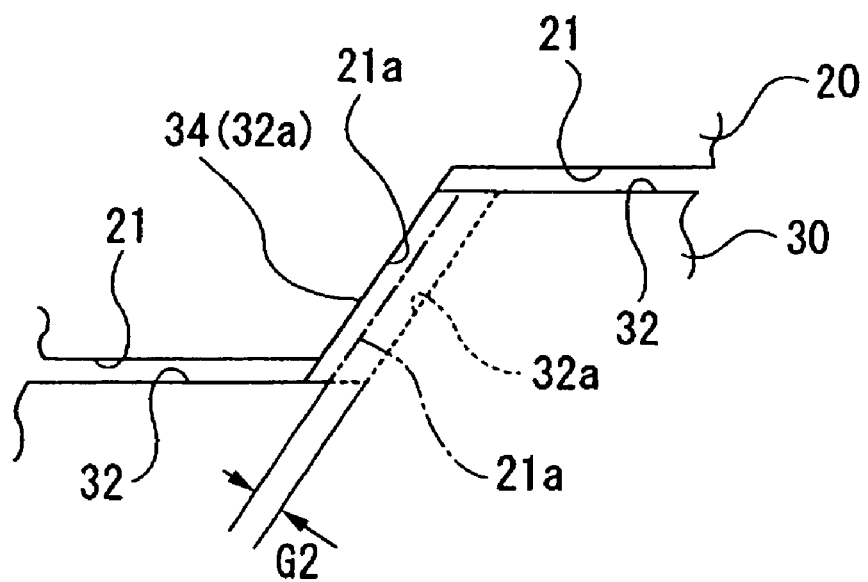

A built-up portion is formed on one part of the welding face 32 of the housing 30. In FIGS. 2A to 2C, the transparent cover 20 and the housing 30 are positioned so they are slightly separated. FIG. 2B is a diagram as viewed along an arrow Y1 in FIG. 2A. As viewed along Y1, the welding face 21 of the transparent cover 20 and the welding face 32 of the housing 30 are moderately curved. FIG. 2C is a diagram as viewed along an arrow Y2 in FIG. 2A. As viewed along Y2, the welding face 21 of the transparent cover 20 and the welding face 32 of the housing 30 have respectively portions 21a and 32a inclined at a large angle, relative to the plane perpendicular to the direction in which pressure is applied (see an arrow P in FIG. 6) at the pressure-bonding step, when the transparent cover 20 is pressure-bonded to the housing 30. As shown in FIG. 3A, when welding faces c and d of a transparent cover a and a housing b are perpendicular to the pressure application direction (see an arrow A in FIG. 3), contact between the two welding faces c and d can be achieved all along their edges, even when, for example, the transparent cover a and the housing b are shifted in the direction perpendicular to the pressure application direction A. However, as shown in FIG. 3B, when welding faces e and f of a transparent cover a and a housing b have portions e' and f' that are inclined at a large angle θ, e.g., an angle equal to or greater than fifteen degrees, relative to the pressure application direction A, a gap g is generated between the inclined portions e' and f' of the welding faces e and f when the transparent cover a and the housing b are shifted relative to each other.

To resolve this problem for the vehicle lighting device 10, a built-up portion is formed on one or both of the inclined portion 21a of the welding face 21 of the transparent cover 20 and the inclined portion 32a of the welding face 32 of the housing 30. It should be noted that the angle α (see FIG. 4A) of the inclined portions 21a and 32a, relative to the plane perpendicular to the pressure application direction at the pressure-bonding step, which will be described later, is equal to or greater than fifteen degrees, for example.

The built-up portion may be formed at the position, for example, where the design data for the transparent cover 20 and the design data for the housing 30 are offset from the normal assembly positions, and where the gap between the welding portion 21 of the transparent cover 20 and the welding portion 32 of the housing 30 is increased relative to the offset value. This is because when the transparent cover 20 and/or the housing 30 is deformed, a gap may appear at a portion where the built-up portion should be formed, e.g., between the inclined portions 21a and 32a, or the inclined portions 21a and 32a may be overlapped. Therefore, a built-up portion is formed at this place in advance to produce an overlap, and before the pressure-bonding step, is softened by preliminary heating. Thus, precise contact between inclined portions 21a and 32a will be achieved, the overlapped portions will be deformed by pressure, and extra resin material will flow out to the side. As a result, constant contact can be maintained between the other portions of the welding faces 21 and 32.

An example for the formation of a built-up portion is shown in FIGS. 4A and 4B. When it is predicted that, as shown in FIG. 4A, a gap indicated by G1, at the maximum, will be formed between the inclined portion 21a of the welding face 21 of the transparent cover 20 and the inclined portion 32a of the welding face 32 of the housing 30, a built-up portion 34, which is slightly larger than is required to fill the gap G1, is formed on the housing 30. It should be noted that a built-up portion may instead be formed on the transparent cover 20, or built-up portions may be formed on both the transparent cover 20 and the housing 30.

Figure 6:
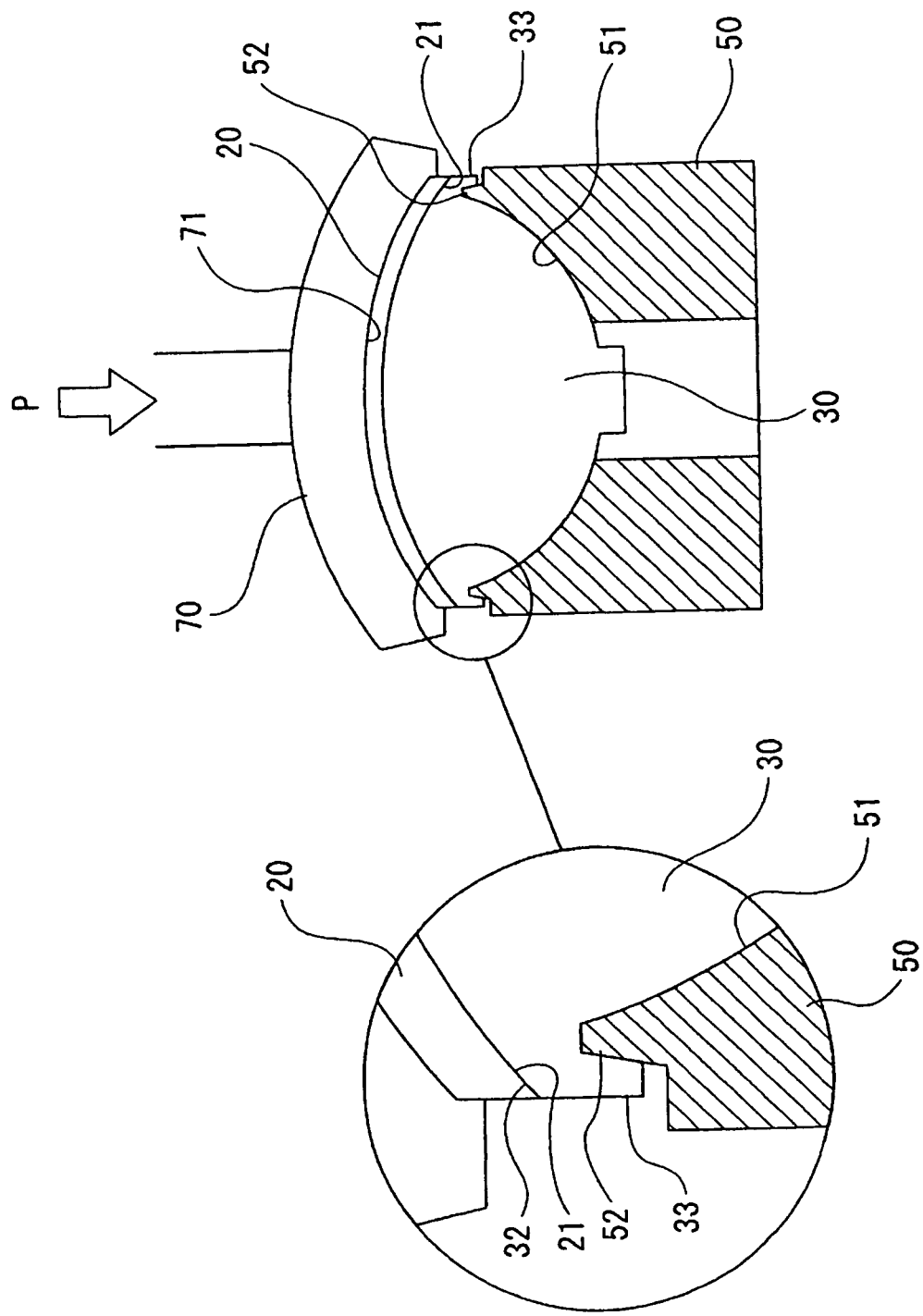
FIG. 6 is a partially cutaway side view of the pressure-bonding process.
Figure 7:
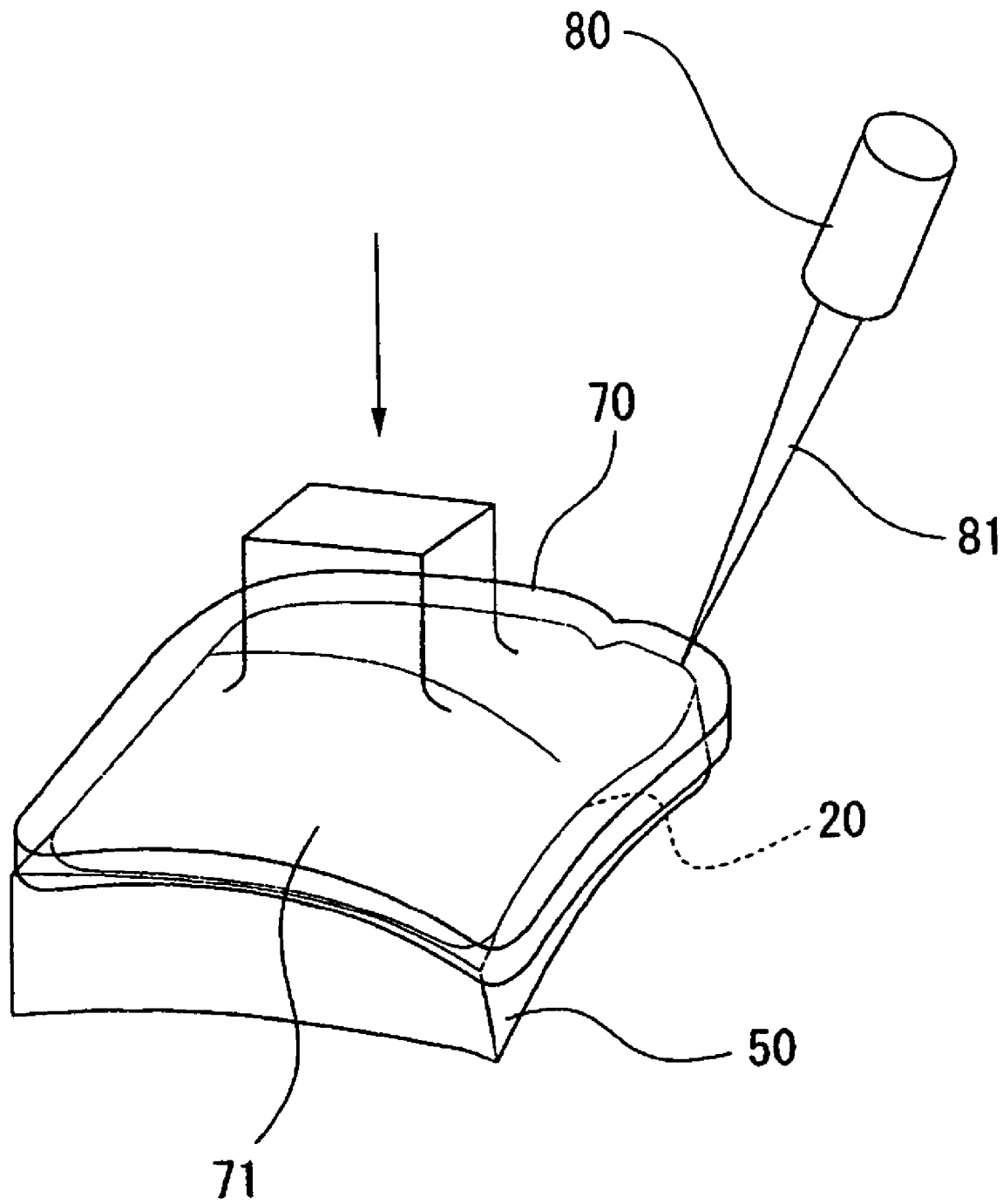
FIG. 7 is a conceptual schematic perspective view of a welding process.

Sequentially, the housing 30 is fitted into a lower jig 50 (see FIG. 6). In the lower jig 50, an acceptance recessed portion 51 is formed to accept the rear face of the housing 30, and the housing 30 is supported with its open face directed upward and its rear face accommodated in the acceptance recessed portion 51 of the lower jig 50. Furthermore, an engaging portion 52 is formed along the edge of the opening of the acceptance recessed portion 51 of the lower jig 50. When the housing 30 is fitted into the acceptance recessed portion 51 of the lower jig 50, an engaged portion 33, which is formed on the reverse side of the edge of the opening of the housing 30, is engaged by the engaging portion 52 of the lower jig 50. Therefore, even when the housing 30 is more or less deformed, the engaged portion 33 of the housing 30 is engaged by the engaging portion 52 of the lower jig 50, so that the engaged portion 33 of the housing 30 is forcibly positioned by the lower jig 50, which is highly rigid. As a result, the shape of the housing 30 is corrected and closely corresponds to the designed shape.

Figure 5:
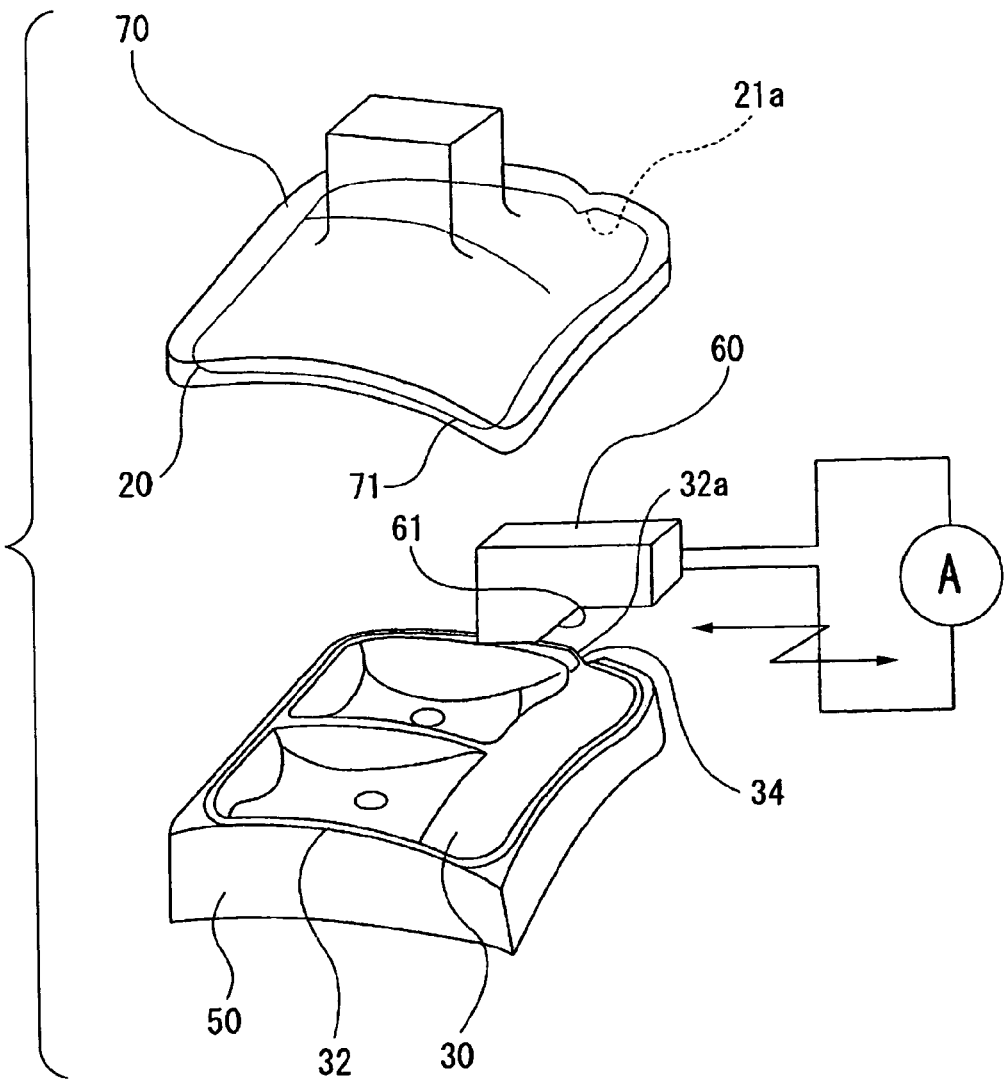
FIG. 5 is a conceptual schematic perspective view of a preliminary heating process.

When the housing 30 is supported by the lower jig 50 in this manner, a heating member 60 is moved, above the housing 30 that is supported by the lower jig 50, between the transparent cover 20, supported by an upper jig 70, and the, housing 30, and a heat transmission end 61 is moved near to the built-up portion 34 on the housing 30 (see FIG. 5). Then, a preliminary heating process is performed. The heating member 60 is, for example, a heater block of a resistance heating type that is freely inserted and retracted from between the upper jig 70 and the lower jig 50. The heat transmission end 61 of the heating member 60 is formed in advance that it matches the shape of the built-up portion 34 formed on the housing 30. The type of the heating member 60 that can be used is not limited, and a hot plate or a resistance heating member, for example, can be employed. As described above, when a resistance heating member is employed as the heating member 60, the thermal energy loss is small, and temperature control is easy. In addition, it is easy for the built-up portion 34 of the housing 30 to be heated to a desired temperature.

The upper jig 70 is formed of a light-transmitting material, and an acceptance recessed portion 71 is formed in the lower portion of the upper jig 70 to accept the front face of the transparent cover 20. The transparent cover 20 is supported after being accommodated in the acceptance recessed portion 71 of the upper jig 70. It should be noted that means, such as air suction, may be employed to supply the support afforded the transparent cover 20 by the upper jig 70.

In the preliminary heating process, the built-up portion 34 is heated to the softening point, so that it is easily deformed when a load is imposed.

When the built-up portion 34 has been softened during the preliminary heating process, the upper jig 70 supporting the transparent cover 20 descends, and a pressure-bonding process is performed to closely attach the welding face 21 of the transparent cover 20 to the welding face 32 of the housing 30. Specifically, when the transparent cover 20 is lowered with the upper jig 70, first, the inclined portion 21a of the welding face 21 of the transparent cover 20 contacts the built-up portion 34 of the housing 30 (see the state indicated by the solid lines in FIG. 4B). In this state, portions of the welding face 21 of the transparent cover 20 other than the inclined portion 21a do not contact the housing 30. In the state indicated by the solid lines in FIG. 4B, when pressure is applied by the upper jig 70 via the transparent cover 20, the softened built-up portion 34 is deformed, and the transparent cover 20 is permitted to descend from the state indicated by the solid lines in FIG. 4B. When the transparent cover 20 is lowered, and the inclined portion 21a of the welding face 21 of the transparent cover 20 reaches a position indicated by a dotted line in FIG. 4B, all portions of the welding face 21 of the transparent cover 20, in addition to the inclined portion 21a, contact the welding face 32 of the housing 30. In this manner, along the entire edges, the welding face 21 of the transparent cover 20 and the welding face 32 of the housing 30 are brought into contact. Assuming that the built-up portion 34 is not formed in the housing 30, the inclined portion 32a of the welding face 32 of the housing 30 is located as indicated by a broken line in FIG. 4B. In this case, when in addition to the inclined portions 21a and 32a the welding face 21 of the transparent cover 20 and the welding face 32 of the housing 30 contact each other, a gap G2 is formed between the inclined portion 21a of the transparent cover 20, which is positioned as indicated by the dotted line in FIG. 4B, and the inclined portion 32a of the housing 30, which is positioned as indicated by the broken line in FIG. 4B.

When, in this manner, the welding face 21 of the transparent cover 20 and the welding face 32 of the housing 30 are brought fully into contact with each other during the pressure-bonding process (see FIG. 6), a ray welding process is performed by the irradiation of the welding face 32 of the housing 30 with a light beam. Specifically, a laser head 80, for example, is positioned above the upper jig 70, and control means, such as a six-axis robot, controls the height and the posture of the laser head 80. Then, a laser beam 81 is emitted by the laser head 80 through the upper jig 70 and the transparent cover 20 onto the welding face 32 of the housing 30. At this time, as the lower jig 50 and the upper jig 70 are rotated synchronously, only a complicated movement need be in charge of the robot that supports the laser head 80. As the laser beam 81 irradiates the welding face 32 of the housing 30, the welding face 32 is heated, and this heat is transmitted to the welding face 21 of the transparent cover 20. As a result, the welding faces 32 and 21, which are both heated, are in a phase-soluble state, and the resin materials of the housing 30 and the transparent cover 20 are fused at the interface of the two welding faces 32 and 21. In this manner, the transparent cover 20 is fixed to the housing 30.

The light beam that can be projected onto the welding face 32 of the housing 30 is not limited to a laser beam. That is, in addition to a laser beam, another appropriate ray, an electromagnetic coherent or non-coherent wave such as a visible light beam, an ultraviolet ray or an infrared ray, may be employed, so long as the welding face 32 of the housing 30 is excited by electromagnetic wave radiation. That is, the material used for the housing 30 has a molecular structure consisting of radicals, the vibration cycle of which matches the wavelength of an electromagnetic wave that is radiated. When the material used for the housing 30 is a material that can not be excited by the radiation of a light beam, a material that can be so excited may be mixed with the material of the housing 30, or may be provided by coating the welding face 32 of the housing 30. For example, when a laser beam is to be used, a laser absorption member must be mixed with the material of the housing 30, or must applied as a coating to the welding face 32 of the housing 30.

As described above, according to this embodiment of the invention, since during the pressure-bonding process the welding face 21 (including the inclined portion 21a) of the transparent cover 20 and the welding face 32 (including the inclined face 32a) of the housing 30 are precisely aligned and contact each other along their entire edges, welding by ray irradiation can be steadily performed. Further, since during the preliminary heating process the built-up portion 34 is heated and softened, only the built-up portion 34 is deformed by pressure applied during the pressure-bonding process, so that accuracy in the size of a lamp is not adversely affected. In addition, the location whereat a flash occurs when the soft resin flows out due to deformation produced by the pressure applied can be limited to the location whereat the built-up portion is formed, instead of along the entire edge. Thus, the external appearance, in its entirety, can be improved.

In this embodiment, the specific shapes and structures of the individual sections are merely examples provided for carrying out the invention, and it should not be inferred that the technical scope of the invention is limited to them.

Embodiments of the present invention can be applied for joining a housing with a transparent cover used for a vehicle lighting device, especially a lamp for a large vehicle. According to embodiments of this invention, appropriate joining can be performed without deterioration of the external appearance.

We claim:

1. A vehicle lighting device manufacturing method, for joining a transparent cover with a housing using ray welding, comprising:
    a preliminary heating step of preparing welding portions of the transparent cover and the housing, and of forming, on part of the welding portion of the transparent cover and/or the housing, a built-up portion, which overlays a welding portion in a design, and heating and softening the built-up portion;
    a pressure-bonding step of pressure-bonding the welding portion of the transparent cover to the welding portion of the housing; and
    a welding step of welding the welding portions of the transparent cover and the housing that are pressure-bonded together by irradiating a light beam onto the welding portions of the transparent cover and the housing along an entire length of edges thereof.

2. A vehicle lighting device manufacturing method according to claim 1, whereby the built-up portion is formed on the welding portion, a plane of which has a predetermined inclination relative to a plane perpendicular to a direction in which pressure is applied at the pressure-bonding step.

3. A vehicle lighting device manufacturing method according to claim 1, whereby the built-up portion is arranged at a portion where design data for the transparent cover and design data for the housing are offset relative to each other, and where a possibility that a gap relative to the offset value will occur is increased between the welding portion of the transparent cover and the welding portion of the housing.

4. A vehicle lighting device manufacturing method according to claim 1, whereby a lower jig having an engaging portion is prepared to support the housing, while for the housing, a pair, at least, of opposed engaged portions are provided to engage the engaging portion; and whereby, at the welding step, the housing is supported by the lower jig while the engaged portions are held by the engaging portion of the lower jig.

5. A vehicle lighting device manufacturing method according to claim 2, whereby the built-up portion is arranged at a portion where design data for the transparent cover and design data for the housing are offset relative to each other, and where a possibility that a gap relative to the offset value will occur is increased between the welding portion of the transparent cover and the welding portion of the housing.

6. A vehicle lighting device manufacturing method according to claim 2, whereby a lower jig having an engaging portion is prepared to support the housing, while for the housing, a pair, at least, of opposed engaged portions are provided to engage the engaging portion; and whereby, at the welding step, the housing is supported by the lower jig while the engaged portions are held by the engaging portion of the lower jig.

7. A vehicle lighting device manufacturing method according to claim 3, whereby a lower jig having an engaging portion is prepared to support the housing, while for the housing, a pair, at least, of opposed engaged portions are provided to engage the engaging portion; and whereby, at the welding step, the housing is supported by the lower jig while the engaged portions are held by the engaging portion of the lower jig.

8. A vehicle lighting device manufacturing method, for joining a transparent cover with a housing, comprising:
   a preliminary heating step, wherein the preliminary heating step comprises:
      preparing welding portions of the transparent cover and the housing,
      forming, on a part of at least one of the welding portion of the transparent cover or the housing, a built-up portion, wherein the built-up portion overlays a welding portion in a design, and
      heating and softening the built-up portion;
   a pressure-bonding step of pressure-bonding the welding portion of the transparent cover to the welding portion of the housing; and
   a welding step of welding the welding portions of the transparent cover and the housing that are pressure-bonded together by irradiating a light beam onto the welding portions of the transparent cover and the housing along an entire length of edges thereof.

9. A vehicle lighting device manufacturing method, for joining a transparent cover with a housing, comprising:
   preparing welding portions of the transparent cover and the housing;
   forming a built-up portion on a part of at least one of the welding portion of the transparent cover or the housing, wherein the built-up portion overlays a welding portion in a design, and
   heating and softening the built-up portion;
   pressure-bonding the welding portion of the transparent cover to the welding portion of the housing; and
   welding the welding portions of the transparent cover and the housing that are pressure-bonded together.

10. A vehicle lighting device manufacturing method according to claim 9, wherein the welding comprises irradiating a light beam onto the welding portions of the transparent cover and the housing along an entire length of edges thereof.

11. A vehicle lighting device manufacturing method according to claim 9, wherein a plane of the built-up portion formed on the welding portion has a predetermined inclination relative to a plane perpendicular to a direction in which pressure is applied during pressure-bonding.

12. A vehicle lighting device manufacturing method according to claim 9, wherein the built-up portion is arranged at a portion where design data for the transparent cover and design data for the housing are offset relative to each other, and wherein a possibility that a gap relative to the offset value will occur is increased between the welding portion of the transparent cover and the welding portion of the housing.

13. A vehicle lighting device manufacturing method according to claim 9, further comprising preparing a lower jig having an engaging portion to support the housing,
   wherein the housing has at least a pair of opposed engaged portions provided to engage the engaging portion; and
   wherein, during welding, the housing is supported by the lower jig while the engaged portions are held by the engaging portion of the lower jig.

* * * * *